Aug. 19, 1969     W. S. SHORE     3,462,067

SELF-SUPPORTING PLASTIC CONTAINER

Filed July 25, 1968

INVENTOR.
WILLIAM S. SHORE
BY
Roy H. Davis
ATTORNEYS.

3,462,067
SELF-SUPPORTING PLASTIC CONTAINER
William S. Shore, Cleveland, Ohio, assignor to Diamond Shamrock Corporation, Cleveland, Ohio, a corporation of Delaware
Continuation-in-part of application Ser. No. 654,241, July 18, 1967, which is a continuation-in-part of application Ser. No. 567,935, July 26, 1966. This application July 25, 1968, Ser. No. 747,753
Int. Cl. B65d 5/42, 1/22, 39/00, 83/00
U.S. Cl. 229—49                                    6 Claims

ABSTRACT OF THE DISCLOSURE

The disclosure is directed to a thin-walled, self-supporting container formed of plastic film or sheet. The body of the container is of generally tubular form and is generally polygonal in cross section. The intersections of the generally polygonal side walls are provided with integral tubes to provide rigidity for the upright body portion. Bulge controlling ribs are also provided at or near the intersections of the side walls to give the filled containers a means for opposing the effect of hydrostatic pressures.

Cross reference to related applications

This application is a continuation-in-part of U.S. application Ser. No. 654,241, filed July 18, 1967, which is a continuation-in-part of U.S. application Ser. No. 567,935, filed July 26, 1966 and now abandoned.

Background of the invention

The invention relates to self-supporting, upright containers and especially to sealed containers used to package liquids such as milk and other liquid food products. More particularly, the invention relates to containers formed of plastic sheet or film having a thickness of 10 mils or less. While plastic containers for packaging milk, fruit juices, bleaches, detergents and other liquids, as well as granulated or powdered solids, are well known, such plastic containers are usually molded such as by blow molding, or other molding techniques well known in the art. In the above mentioned applications, methods are disclosed for forming containers from relatively thin plastic sheet or film. In the second mentioned application, containers of thin film having internal reinforcing rods or tubes and longitudinally spaced bulge controlling transverse seals are disclosed.

Containers according to the subject invention constitute a further improvement over the above mentioned containers in that they exhibit improved top loading capabilities, improved bulge controlling capabilities and higher impact strength by incorporating an integral tubular edge portion.

Summary of the invention

It is among the objects of the invention to provide an improved self-supporting container fabricated from relatively thin plastic sheet or film such as high density polyethylene resin.

Another object of the invention is to provide partly fabricated plastic strips which may be shipped to and stored at a packaging facility in roll or folded form and subsequently formed into improved self-supporting, liquid-tight containers.

Still another object is to provide a thin-walled container of plastic sheet or film having an integral reinforcing frame which makes the container capable of top loading.

These and other objects of the invention are accomplished by the container construction embodied in the present invention, which may be formed by the following method:

(1) Adhering adjacent, narrow, superposed, longitudinal portions of a tubular length of plastic sheet at eight perimetrically spaced areas to form four integral, bulge controlling ribs and forming integral plastic tubular reinforcing members, each extending longitudinally of and substantially coextensive with one of the ribs;

(2) Forming a container body portion of polygonal cross section intermediate the ends of the length, the ribs being located at the intersections of the side walls of the body portion; and (3) Collapsing and folding one of the ends of the length to provide a closed end, filling and forming a closure at the other end.

The adhering of the adjacent portions of the plastic sheet or film in forming bulge controlling ribs may be accomplished, for example, by heat-sealing, or other known sealing methods. According to one convenient method, sealing is accomplished by passing the adjacent portions of the plastic sheet to be adhered between heated jaws, or other heat and pressure exerting means, to form and seal buldge controlling ribs.

Preferably, elongated bulge controlling ribs of varying width are formed. The bulge controlling ribs extend in a direction parallel to the tubular reinforcing members and may increase in width from the upper toward the lower end of the container as required to control bulging. The bulge controlling ribs increase the top loading capability of the container and reduce bulging of the side walls due to hydrostatic pressure within the container when the container is filled.

The article embodying the invention is a thin-walled container formed of plastic sheet or film and including an upright tubular body portion having generally polygonal side panels and a generally polygonal transverse cross section.

The plastic material is preferably a polyethylene resin of the high density group. i.e., having a density from 0.941 to 0.965. For the purposes of these containers, the thickness is of the order of 3 to 10 mils. The material may also be polypropylene, polyvinyl chloride or other suitable material. Plastic means provide rigidity for the body portion at each of the intersections of the side panels, the means including two adjacent portions of the plastic sheet or film adhered to one another to form an integral rib and an integrally formed plastic tubular member formed at the outer edge of each rib.

According to one embodiment of the container, the side panels are generally rectangular and the body portion has a generally rectangular, transverse cross section, and the tubular reinforcing members are substantially coextensive with the bulge controlling ribs.

While thermoplastic material is preferred for the container, other material that lends itself to post operational plastic forming may also be used.

Brief description of the drawings

The above and various other objects, features and advantages of the invention will be more clearly understood from a reading of the detailed description of the invention in conjunction with the drawing in which.

Description of the preferred embodiment

Figure 1:
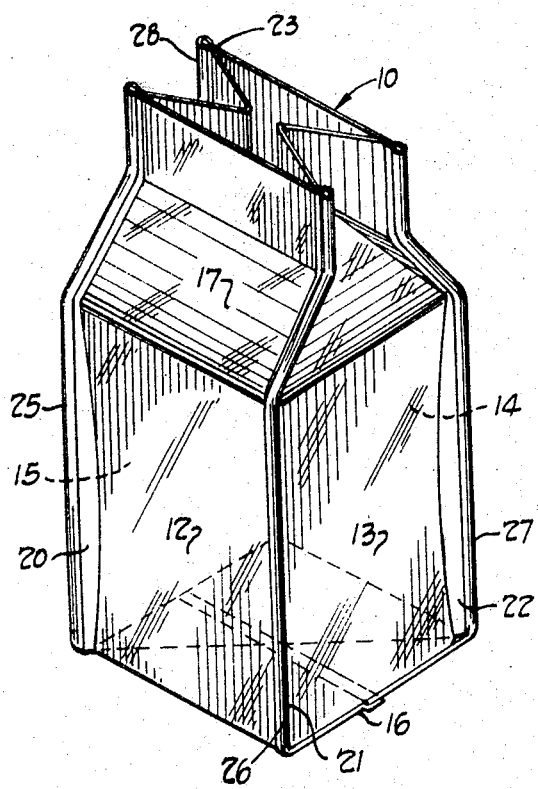
FIG. 1 is a view in perspective of one illustrative embodiment of container according to this invention.
Figure 2:
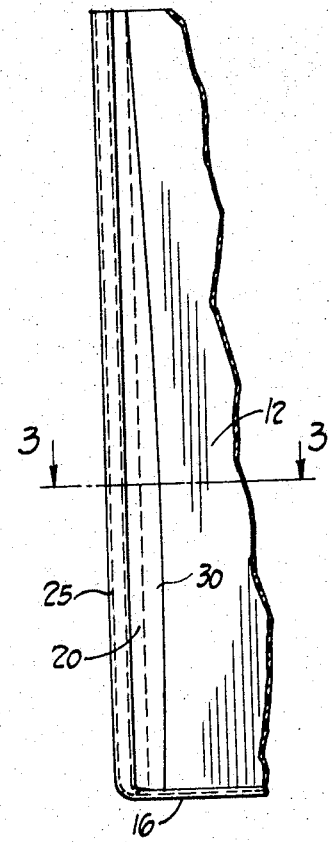
FIG. 2 is a fragmentary view in elevation of the embodiment of FIG. 1 to an enlarged scale.
Figure 3:
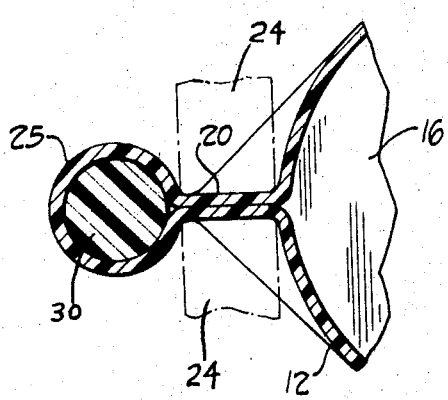
FIG. 3 is a view in plan of the fragment taken along the line 3—3 shown in FIG. 2, to a still larger scale and including, in phantom, a portion of heat sealing means for forming the bulge controlling ribs and reinforcing tubes.

Referring now to the drawings, one embodiment of a plastic container 10 is shown in perspective in FIG. 1, and fragments of container 10 are shown in FIGS. 2 and 3, which are views in elevation and plan, respectively, of the embodiment shown in FIG. 1 to enlarged scales.

Container 10 includes side walls 12, 13, 14 and 15, a bottom 16, and a top portion 17. The container 10 is preferably formed from tube or sheet of high density polyethylene resin or other suitable plastic having a thickness of at least 3 mils, and preferably in the range of 4 to 10 mils. This plastic is merely by way of example, but is preferable because of its wide temperature range, relatively high stiffness, yield, good general machining performance, printability, heat-sealing and non-heat shrinking properties.

In initially forming the tubular material to define container 10, four bulge controlling ribs are produced, which are identified as 20, 21, 22 and 23. The edge seals, such as seal 20, may be produced with increasing width which increases from a "top" cutoff line toward a "bottom" cutoff line.

In its simplest form, the plastic tubular material is formed by a continuous extruder and a group of rollers of the type disclosed in the first mentioned application above, and the tubular reinforcing members are integrally formed in a continuous process in which each of the ribs and tubular members are formed by pairs of heated, opposed jaws, such as jaws 24. After the tubular reinforcing members and ribs are formed, there is provided a continuous length or strip of plastic material consisting of a plurality of container forming blanks in end to end relationship that may be rolled or folded for compact shipment to the ultimate packager or user.

Handles and pouring spouts may be provided in accordance with the structures disclosed in the above mentioned applications.

The previously mentioned bulge controlling seals or ribs reduce shelf space required for the containers and also contribute to the top loading capabilities. As the ribs 20, 21, 22 and 23 are formed, integrally formed tubular members 25, 26, 27 and 28 are also being formed. The circular cross section of the tubular members 25, 26, 27 and 28 may be produced by rods extending from the extrusion die and cooperating with jaws 24, such as rod 30, shown in FIG. 3. Alternatively, rods such as 30 may be inserted in the tubular members 25, 26, 27 and 28 and removed before the container ends are sealed.

When the ultimate user receives the elongated strip material, suitable machinery is employed to uncoil and cut a length of the material, open at least a portion of the length, close one end of the length, fill the resulting container, and seal the opposite end of the length of material.

The steps of completing the container performed by the ultimate user are conventional and are, therefore, not described in detail.

While one illustrative embodiment of the invention has been shown and described in detail, it is understood that other embodiments may be employed without departing from the spirit and scope of this invention.

Comparative tests of containers having only ribs with containers according to this invention, both empty and filled, conclusively show that greatly increased top loading capability is obtained by utilizing tubes such as tubes 25, 26, 27 and 28. For example, an empty container having ribs with no tubes collapsed with 4½ pounds dead weight top loading. An identically sized container, also empty, having tubes such as tubes 25, 26, 27 and 28 disclosed herein, collapsed only after 18 pounds of dead weight top loading was applied. Filled containers yielded similarly unusual and unforeseen results. A filled container having only ribs collapsed under 16 pounds dead weight top loading; whereas, a filled container having edge tubes such as 25, 26, 27 and 28 collapsed only after 40 pounds dead weight top loading was applied. In other words, the addition of the tubes gave the empty containers approximately four times as much top loading strength, and the filled containers, about two and one-half times that of identically sized containers formed of the same thickness of plastic material, but without tubes. The containers tested had ribs of the order of one-eighth inch in width, and tubes a diameter of the order of one-eighth inch. The bulge controlling ribs, such as ribs 20, 21, 22 and 23, varied between one-sixteenth and one-eighth of an inch.

What is claimed is:

1. In a thin-walled container formed of plastic sheet, said container including an upright tubular body portion having generally polygonal side panels, the improvement which comprises means for providing rigidity for said body portion at the intersections of said side panels, said means including at each of said intersections, two adhering portions of said flexible plastic sheet forming a rib and a tubular member joined to and extending parallel to the exterior portions of said rib.

2. The container according to claim 1 wherein said ribs have portions of varying width, with narrower portions in the upper portion of said container and wider portions in the lower portion of said container.

3. A container as defined in claim 1 wherein said tubular members and said ribs are integrally formed with said plastic sheet.

4. A plurality of thin-walled plastic container forming portions in continuous form, said container forming portions having a generally tubular body portion, top and bottom forming portions, said body portion having generally polygonal side portions, a plurality of longitudinal ribs formed by adhering adjacent side portions, and a plurality of tubular plastic members, each joined to the outer extremity of one of said ribs to permit top loading of said containers.

5. The container forming portions in continuous form according to claim 4, wherein said ribs are of varying width, increasing in width from the upper portion of the material for a given container toward the bottom of the material for said container.

6. The container forming portions in continuous form according to claim 4 wherein said ribs and said tubular members are integrally formed from said plastic material and wherein said ribs are of greater width in the regions to be subjected to greater hydrostatic pressure when the containers are completed and filled.

References Cited

UNITED STATES PATENTS 3,164,695  1/1965  Sanni.
3,406,892  10/1968  Egleston et al.

FOREIGN PATENTS 620,232  10/1961  Italy.

DAVID M. BOCKENEK, Primary Examiner

U.S. Cl. X.R.

229—17, 37